(12) United States Patent
Anderson

(10) Patent No.: US 7,827,346 B2
(45) Date of Patent: Nov. 2, 2010

(54) DATA STORAGE DEVICE

(75) Inventor: Dennis Anderson, Naperville, IL (US)

(73) Assignee: Plankton Technologies, LLC

( * ) Notice: Subject to any disclaimer, the term of this patent is extended or adjusted under 35 U.S.C. 154(b) by 0 days.

(21) Appl. No.: 11/838,260

(22) Filed: Aug. 14, 2007

(65) Prior Publication Data
US 2008/0040531 A1    Feb. 14, 2008

Related U.S. Application Data

(60) Provisional application No. 60/822,356, filed on Aug. 14, 2006.

(51) Int. Cl.
*G06F 12/00* (2006.01)
*G06F 13/00* (2006.01)
*G06F 13/28* (2006.01)

(52) U.S. Cl. ............... 711/103; 711/E12.055; 711/E12.081; 711/E12.084

(58) Field of Classification Search ............. 711/103, 711/E12.055, E12.081, E12.084
See application file for complete search history.

(56) References Cited

U.S. PATENT DOCUMENTS

| | | | |
|---|---|---|---|
| 6,000,006 A | 12/1999 | Bruce et al. | |
| 6,768,642 B2* | 7/2004 | Hines et al. | 361/721 |
| 7,457,897 B1* | 11/2008 | Lee et al. | 710/74 |
| 2004/0177054 A1* | 9/2004 | Stern et al. | 707/1 |
| 2004/0193564 A1 | 9/2004 | Ban | |
| 2005/0005076 A1 | 1/2005 | Lasser | |
| 2005/0027928 A1* | 2/2005 | Avraham et al. | 711/103 |
| 2005/0060486 A1* | 3/2005 | Kang et al. | 711/103 |
| 2005/0276249 A1 | 12/2005 | Damnjanovie | |
| 2007/0263469 A1* | 11/2007 | Cornwell et al. | 365/226 |
| 2007/0276995 A1* | 11/2007 | Caulkins et al. | 711/113 |

* cited by examiner

*Primary Examiner*—Sheng-Jen Tsai
(74) *Attorney, Agent, or Firm*—Jennifer Meredith; Fariba Sirjani Meredith & Keyhani, PLLC

(57) ABSTRACT

A data storage device comprising: at least two flash devices for storing data; a circuit board, wherein each of the flash devices are integrated on the circuit board; a controller integrated on the circuit board for reading and writing to each flash devices, wherein the controller interfaces each flash devices; at least one NOR Flash device in communication with the controller through a host bus; at least one host bus memory device in communication with the controller and at least one NOR Flash device through the host bus; at least one interface in communication with the controller and adapted to physically and electrically couple to a system, receive and store data therefrom and retrieve and transmit data to the system.

38 Claims, 3 Drawing Sheets

DATA STORAGE DEVICE

This application claims priority to provisional patent application 60/822,356 as filed Aug. 14, 2006 and entitled "Data Storage Device".

BACKGROUND OF THE INVENTION

The present invention related generally to storage devices and more particularly to a solid state disk storage devices.

Integrated circuits are used in a wide variety of electronics and electronic equipment. Currently NAND Flash devices are used mainly in memory sticks and consumer products, such as IPODs, digital cameras, settop boxes and the like. These are mainly 1-2 NAND Flash devices per application. Typically a flash drive is a NAND-type flash memory integrated with a USB interface and used as a removable data storage device such as a flash drive, USB Key and thumb drive. It is typically powered by a USB connection and does not require an external power source or battery power source.

Applications that require large amounts of storage typically use 1.8 inch or larger hard drives to achieve their goals. Hard drives are mechanical, unreliable, relatively slow and consume more power than solid state disks. Until now, there has not been a solid state disk that can displace smaller hard drives (HD's). Another problem with the prior art HD is that they have moving parts, are slow and unreliable. In contrast, the present invention provides no mechanically moving parts, is extremely reliable as it guarantees data retention, can be erased and reprogrammed <100,000 times, are orders of magnitude faster than the fastest HD and consume much less power than HDs. The present invention also provides a higher level of data integrity than HDs. A flash drive can sustain only a limited number of write/erase cycles before failure. This makes the flash drive undesirable for running application software such as Excel®, Word® and Photoshop®. Also, a prior art flash drive would be precluded from running most operating systems that operate on the hard drive.

Accordingly, what is needed is a device and methods that has no moving parts, is reliable, consumes less power and adds low-cost high performance memory to a wide variety of electronic equipment.

SUMMARY OF THE INVENTION

The present invention relates generally to data storage devices that are reliable, low-cost, low power and high performance.

According to one embodiment of the present invention, a data storage device is provided comprising: at least two flash devices for storing data; a circuit board, wherein each of the flash devices are integrated on the circuit board; a controller integrated on the circuit board for reading and writing to each flash devices, wherein the controller interfaces each flash devices; at least one NOR Flash device in communication with the controller through a host bus; at least one host bus memory device in communication with the controller; at least one interface in communication with the controller and adapted to physically and electrically couple to a system, receive and store data therefrom and retrieve and transmit data to the system.

According to another embodiment of the present invention, a data storage device is provided comprising: at least two NAND flash devices for storing data; a circuit board, wherein each of the NAND flash devices are integrated on the circuit board; a controller integrated on the circuit board for reading and writing to each flash devices, wherein the controller interfaces each flash devices; at least one NOR Flash device in communication with the controller through a host bus; at least RAM memory device in communication with the controller and at least one NOR Flash device through the host bus; at least one PCI interface in communication with the controller and adapted to physically and electrically couple to a system, receive and store data therefrom and retrieve and transmit data to the system. There may also be additional SDRAM in communication with the controller.

These and other features, aspects and advantages of the present invention will become better understood with reference to the following description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
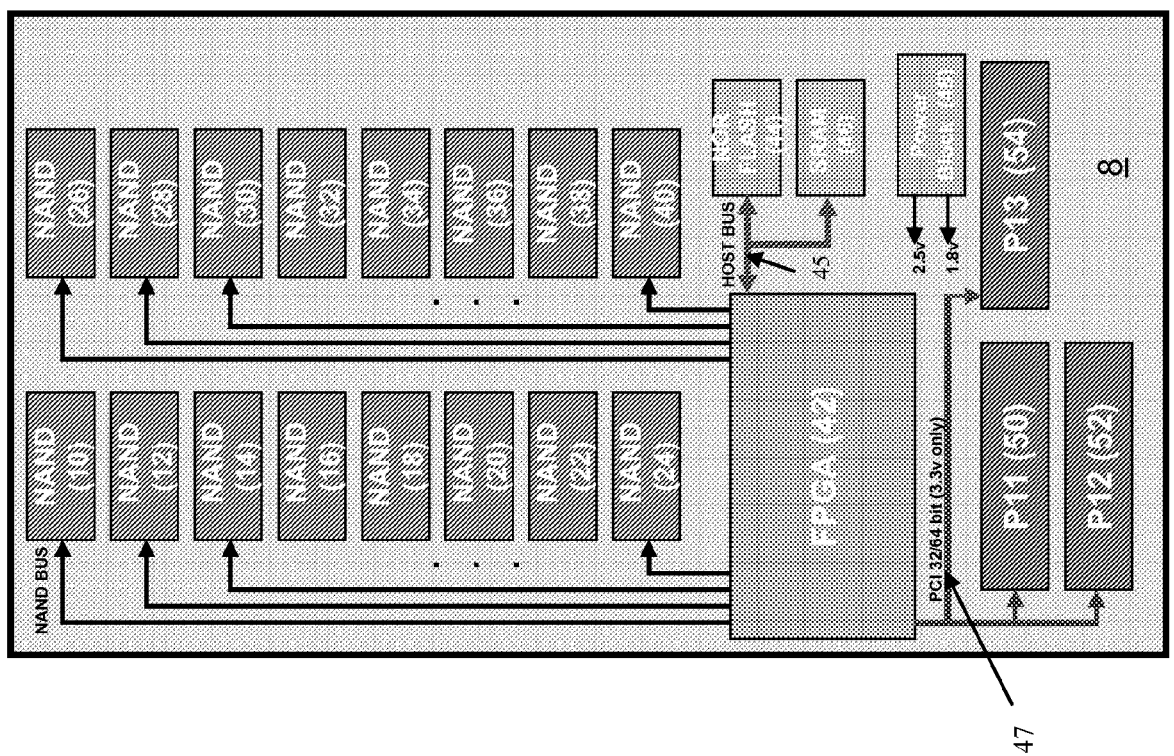
FIG. 1 depicts one embodiment according to the present invention.

According to one embodiment of the present invention, as depicted in FIG. 1, the device is supported on a standard single width PCI PMC module and can support up to 32 Gbytes of NAND Flash for cPCI/cPSB, VME, ATCA or proprietary baseboards. The circuit board may be any board, but according to a preferred embodiment may be Peripheral component interconnect (PCI), Mezzanine Card (PMC), a Processor PMC (PPMC), and a Conduction-Cooled PMC (CCPMC). The circuit board circuit board may be compatible with at least one of a Compact PCI (CPCI) baseboard, a Versa Module Eurocard (VME) baseboard, a Advanced Telecommunications Computing Architecture (ATCA) baseboard and a proprietary baseboard. It can support JFFS1/2/3 or NTFS file systems and interface to either 32 bit or 64 bit 66 MHZ PCI. The controller (42) is a FPGA based NAND Flash controller and interfaces to each NAND flash device (e.g. 10-40) individually and also contains at least one programmable softcore microprocessors. The main microprocessor may be a softcore microprocessor.

According to one embodiment, the board is 149 mm in length and 74.0 mm in width. The height may be X.X mm. The power requirement is 3.3v @ 2 W typ. The temperature range is 0° to 70° C. com and −45° to 85° C. ind. The specifications are IEEE 1386.1 and PCI 2.2. There may be 32/64 bit 66 MHZ PCI 2.2 via PMC P11,P12 and P13 connectors communication ports. The indicated applications are high speed, high thru-put HDD replacement, high reliability servers, gateways and wireless infrastructure ad servers, gateways and wireless infrastructures that require high thru-put.

This allows: all 32 Gbytes to look like one large block of storage; can support different file systems i.e. JFFS1/2/3 and NTFS; can support different operating systems i.e. Linux, uC linux, windows CE or NT, etc.; concurrent reads and writes to each NAND Flash device provide the highest thru-put on the market today; limited only by the primary interface (PCI in the initial case, the interface may also be, for example, Serial Advanced Technology Attachment and Peripheral Component Interconnect). OS can be writing or reading all NAND devices simultaneously; data can be "striped" across multiple NAND devices; wear leveling of NAND devices can be controlled; NAND "bad block" detection is performed concurrently across all devices via HW and is extremely fast; "bad block" detection is continued during operation as blocks continue to drop out and may detect bad blocks in each flash device concurrently; write protection and sleep mode are supported on all NAND devices; data integrity is maintained through out entire data path; parity (if provided by baseboard) on PCI interface; ECC is calculated, stored and checked with each data block written to NAND flash with multiple bit errors being corrected and the microprocessor notified of all errors; parity is used on external SRAM, FPGA; consumes very little power comparable to Hard Drive solutions; provides NOR Flash for microprocessor code and "bad block" tables; product can be updated/upgraded in the field-both field-programmable gate array (FPGA) code and microprocessor codes.

As shown in FIG. 1, a data storage device (8) is provided comprising: at least two flash devices (e.g. 10, 12, 14, 16, 18, 20, 22, 24, 26, 28 30, 32, 34, 36, 38 and 40) for storing data. The flash devices can be any size, for example between 1 GB and 8 GB and may be NAND flash devices. According to a preferred embodiment, a solid state storage device is envisioned that are SLC NAND flash devices. Each of the NAND devices has its own interface and each NAND device has its own microprocessor. According to one embodiment there are 16 microprocessors (uPs) for 16 NANDs in the initial design. Each uP has direct control of its own NAND device. Each flash devices having an individual interface and individual microprocessor. This provides significant processing power for each NAND and also with HW acceleration would provide very high performance for reads, programs and erases since each NAND device may be accessed simultaneously. Using individual microprocessors (16 uPs) also allows the present invention to add on additional features and applications very quickly without sacrificing performance. There is a circuit board (8) and each of flash devices are integrated on the circuit board (8). The controller (42) is a Field Programmable Gate Array (FPGA) which allows a high level of flexibility for the primary interface, the initial interface is PCI but with the flexibility of an FPGA the interface may be quickly adapted the primary interface to others i.e SATA, PCIe, PATA, etc. The controller (42), as would be appreciate by those skilled in the art, may be many different types including ASSP, ASIC and a structured ASIC. The controller (42) is integrated on the circuit board (8) for reading and writing to each of the flash devices (e.g. 10, 12, 14, 16, 18, 20, 22, 24, 26, 28 30, 32, 34, 36, 38 and 40), wherein the controller interfaces to each of the flash devices (e.g. 10, 12, 14, 16, 18, 20, 22, 24, 26, 28 30, 32, 34, 36, 38 and 40). The controller (42) may read and write to each flash device concurrently. The controller (42) may have a data-integrity module. The controller (42) may also have a sleep-mode module, wherein the sleep-mode module enables sleep mode for the flash device(s) based on a predefined criterion. The controller (42) may also have a prevention module for controlling the wear level of each said at least one flash device. The controller (42) may further have a write-protection module, wherein the write-protection module provides write protection on each flash device. The controller (42) may divide data into a plurality of data blocks, at least one data block being stored in a flash device from the plurality of flash devices. There may be an Error Correcting Code module integrated on the circuit-board. The error correcting code module may be adaptively coupled to the controller and may detect at least one error in each data block written on each flash device; notify at least one error to the flash controller; and allow for correction of error. The error correcting code module executes error correcting code and the error correcting code is selected from the group consisting of parity code, Hamming code, Reed-Solomon code, Reed-Muller code, Binary Golay code, convolutional code, and turbo code to detect the plurality of errors. There may be at least two die on the circuit board, wherein the at least two die may be concurrently accessed.

There is at least one NOR Flash device (44) in communication with the controller (42). The NOR flash (44) is used by the controller (42) as program store for internal uPs, also stores bad block tables and wear level tables. The device also has at least one host bus memory device (46) in communication with the controller (42) and the NOR Flash device (44) through the host bus (45). The NOR flash (44) contains the Operating System (OS) that provides control of the softcore microprocessor(s). NOR Flash (44) also contains security algorithms, integrity, data manipulation, status and monitoring. As shown in Figure one, the host bus memory device is SRAM (46) and used by the controller (42) as scratch memory and stack for internal uPs. There is also at least one interface (47) in communication with the controller (42) and adapted to physically and electrically couple to a system, receive and store data there from and retrieve and transmit data to the system. As shown in FIG. 1, there is also a power block (48). The power Block (48) is used to create voltages required to power all devices on PCB. Connectors (50,52,54), as shown in FIG. 1, are PMC PCI connectors used to connect the circuit board (8) to host/mother board.

Figure 2:
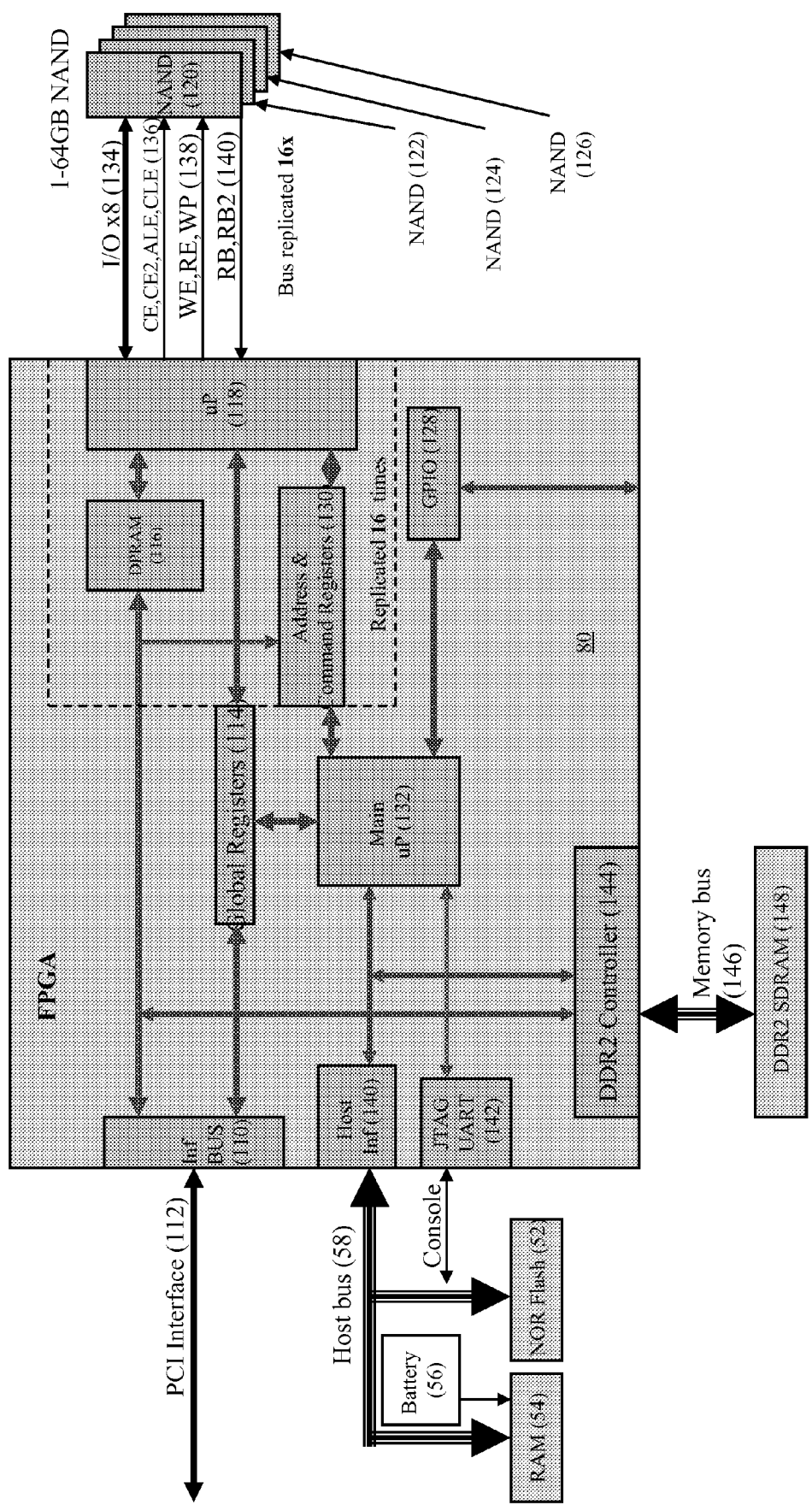
FIG. 2 depicts one embodiment according to the present invention.
Figure 3:
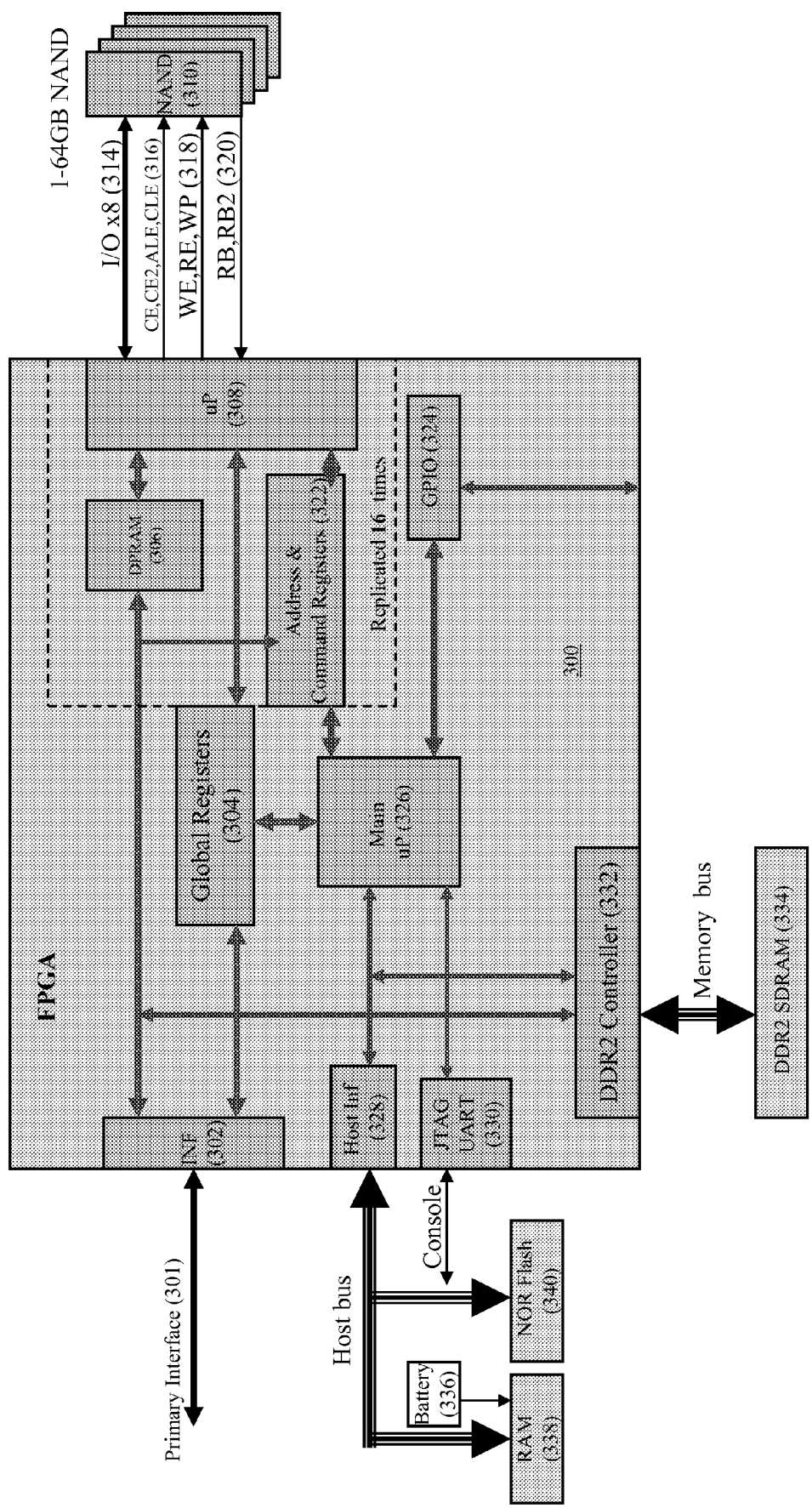
FIG. 3 depicts one embodiment according to the present invention.

As shown in FIGS. 2 and 3, the PCI Interface (112) and primary interface (301) are connected to the controller (80 and 300) through an interface bus (110, 302). A SATA/SAS interface requires an external Phy. A PHY is a component of an integrated circuit and serves as the electrical interface that performs the data transmission between the HDD and the host. There are also host Interfaces (140, 328) that are used to interface external NOR Flash (52 and 340) and host bus memory which is external volatile memory such as RAM (54) and RAM (337) to controller. JTAG UART (142, 330) is a JTAG interface used to debug and control internal uPs. Provides direct control of internal uPs without having to use the primary interface (e.g. 112 and 301). There may be a DDR2 Controller (144, 332) which is a module that provides all of the control and timing to interface internal uPs and primary interface to external DDR2 memory (such as SDRAM (148 and 334). DDR2 SDRAM is double data rate two synchronous dynamic random access memory. The main microprocessor (Main uP (132, 326)) is the main internal microprocessor that provides for control of the primary interface and also has direct control of all other internal uPs (such as 118 and 308, it should be understood that these are repeated 16 times and only one is depicted). The main microprocessor (132, 136) is used for OA&M (operation, administration and maintenance) functions, controls a main interface and controls each of the additional microprocessors. The Global Registers (114, 304) Control and status registers that are global to each of the 16 NAND interfaces. These registers control such functions as: Check for bad blocks, check for NAND device ID, NAND write protect, HW/SW/FW version control, NAND Resets, Ready/Busy status, Interrupt status and masks, Interrupt Source, ECC status and control. RAM (54, 338) is external volatile memory used by the controller as scratch memory and stack for internal uPs. The NOR Flash (52, 340) is external NOR flash used by the controller as program store for internal uPs, also stores bad block tables and wear leveling tables. The Wear leveling and bad blocks must be supported in FPGA. The DDR2 SDRAM (148, 334) is external DDR2 SDRAM used by internal uPs and primary interface for buffer storage, temporary storage of large amounts of data. The PCI Interface (112) is the initial interface offered on PCI PMC board.

The host bus (58) is an external parallel bus used to provide access to external NOR Flash and volatile memory. The DPRAM (116, 306) is a dual port RAM used to buffer data that is going to and from NAND Flash devices. The DPRAM is accessible from internal uPs and primary interface. Each interface to a NAND Flash has its own DPRAM. The address and command registers (130, 322) are internal registers are used to communicate with each NAND uP to indicate what operation to perform on its NAND Flash i.e read, write, erase, cache, etc. These registers are accessible by internal uP and primary interface. The uP (118,308) depict each uP associated with each NAND interface, these uPs along with HW acceleration control all aspects of the NAND Flash. The NAND Flash (e.g. 120, 122,124,126 . . . 310). There are external NAND Flash devices. The design as shown has 16 external NANDs, but any number can be accommodated. The GPIO (128, 324) are general purpose IOs that can be user defined. Currently used to control LEDs that indicate device activity. The Battery (56, 336) may be a Li Battery used power volatile memory in case of power failure. Data stored in volatile memory will be retained until power is restored. The present invention, though, may utilize static random access memory (SRAM) or synchronous dynamic random access memory (SDRAM) in communication with the controller (80). The SDRAM may be added to support large block transfers from the host. Sram may also be changed to PSRAM which is cheaper and lower power. The data storage device is compatible with a plurality of file systems, such as Journaling Flash File System (JFFS1), JFFS2, JFFS3, New Technology File System (NTFS), File Allocation Table (FAT), Hierarchical File System (HFS), HFS+ and Versioning File System. The data storage device also is compatible with a plurality of Operating Systems, such as Linux, uC Linux, Windows CE, Windows NT, Windows 98, Windows XP, Windows Vista, and Windows Server.

It should be understood that the foregoing relates to preferred embodiments of the invention and that modifications may be made without departing from the spirit and scope of the invention as set forth in the following claims.

I claim:

1. A data storage device comprising:
    at least two flash devices for storing data;
    a circuit board, wherein each said at least two flash devices are integrated on said circuit board;
    a controller integrated on said circuit board for reading and writing to each said at least two flash devices, wherein said controller interfaces each said at least two flash devices individually through an independent NAND bus, the NAND bus coupling one of the flash devices to the controller being independent from the NAND bus coupling another one of the flash devices to the controller, and said controller further comprising a bad-block module, wherein said bad-block module detects bad blocks in each said at least two flash devices during operation of said data storage devices;
    at least one NOR Flash device in communication with said controller through an independent host bus;
    at least one host bus memory device in communication with said controller through said host bus; and
    at least one interface in communication with said controller and adapted to physically and electrically couple to a system, receive and store data therefrom and retrieve and transmit data to said system,
    wherein each flash device is a chip adapted for including two or more dies,
    wherein said controller is adapted to communicate with all the flash devices simultaneously, and
    wherein the host bus is utilized for communication between the controller and exclusively the NOR Flash device and the host bus memory device.

2. The data storage device of claim 1, wherein said data storage device is a solid state storage device.

3. The data storage device of claim 1, wherein at least one said flash device is a NAND flash device.

4. The data storage device of claim 1, wherein said circuit board is selected from the group consisting of Peripheral component interconnect (PCI), Mezzanine Card (PMC), a Processor PMC (PPMC), and a Conduction-Cooled PMC (CCPMC).

5. The data storage device of claim 4, wherein said circuit board is compatible with at least one of a Compact PCI (CPCI) baseboard, a Versa Module Eurocard (VME) baseboard, a Advanced Telecommunications Computing Architecture (ATCA) baseboard and a proprietary baseboard.

6. The data storage device of claim 1, further comprising Static Random Access Memory (SRAM) in communication with said controller.

7. The data storage device of claim 1, wherein said controller is a Field Programmable Gate Array (FPGA) based NAND flash controller.

8. The data storage device of claim 1, wherein said controller is selected from the group consisting of ASSP, ASIC and a structured ASIC.

9. The data storage device of claim 1, wherein said controller comprises at least one programmable microprocessor.

10. The data storage device of claim 9, further comprising an interface for interfacing said controller with each flash device and wherein said at least one programmable microprocessor consist of seventeen (17) programmable microprocessors and wherein each said interface is controlled by an autonomous microprocessor.

11. The data storage device of claim 9, wherein said at least one programmable microprocessor is a main microprocessor.

12. The data storage device of claim 11, wherein said main microprocessor is used for OA&M functions, controls a main interface and controls each of the additional microprocessors.

13. The data storage device of claim 9, wherein the controller is further comprised of a bad-block module, wherein said bad-block module detects bad blocks in each said at least one flash device during operation of said data storage devices.

14. The data storage device of claim 13, wherein said bad-block module detects bad blocks in each said at least one flash device concurrently.

15. The data storage device of claim 9, further comprising a NOR Flash drive is communication with said controller.

16. The data storage device of claim 15, further comprising at least one programmable microprocessor, wherein said NOR flash is adaptively coupled to said at least one programmable microprocessors and said controller, wherein said NOR flash has at least one code of said programmable microprocessor.

17. The data storage device of claim 15, wherein said NOR flash contains the Operating System (OS) that provides control of the main microprocessor(s).

18. The data storage device of claim 17, wherein said controller is a FPGA based NAND Flash controller and said microprocessor initializes, controls, provisions, maintains, and diagnoses the Flash devices and internal registers of the FPGA.

19. The data storage device of claim 17, wherein said NOR Flash contains security algorithms, integrity, data manipulation, status and monitoring.

20. The data storage device of claim 17, wherein said NOR Flash contains a bad block table.

21. The data storage device of claim 17, wherein said NOR Flash contains a wear-leveling table.

22. The data storage device of claim 1, wherein said controller further comprises a data-integrity module.

23. The data storage device of claim 1, wherein said controller further comprises a sleep-mode module, wherein said sleep-mode module enables sleep mode for said at least one flash device based on a predefined criterion.

24. The data storage device of claim 1, wherein said controller further comprises a prevention module for controlling the wear level of each said at least one flash device.

25. The data storage device of claim 1, wherein said controller further comprises write-protection module, wherein said write-protection module provides write protection on each said at least one flash device.

26. The data storage device of claim 1, wherein said controller reads and writes to each flash device concurrently.

27. The data storage device of claim 1, further comprising at least two die, wherein said at least two die may be concurrently accessed.

28. The data storage device of claim 1, wherein the controller divides data into a plurality of data blocks, at least one data block is stored in a flash device from the plurality of flash devices.

29. The data storage device of claim 1, further comprising an Error Correcting Code module integrated on the circuit-board.

30. The data storage device of claim 23, wherein said error correcting code module is adaptively coupled to said controller.

31. The data storage device of claim 23, wherein said Error Correcting Code is configured to:
   a. detect at least one error in each data block written on each said at least one flash device;
   b. notify said at least one error to said flash controller; and
   c. allow for correction of said at least one error.

32. The data storage device of claim 23, wherein said error correcting code module executes error correcting code and said error correcting code is selected from the group consisting of parity code, Hamming code, Reed-Solomon code, Reed-Muller code, Binary Golay code, convolutional code, and turbo code to detect the plurality of errors.

33. The data storage device of claim 1, wherein said data storage device is compatible with a plurality of file systems, said plurality of file systems selected from the group consisting of Journaling Flash File System (JFFS1), JFFS2, JFFS3, New Technology File System (NTFS), File Allocation Table (FAT), Hierarchical File System (HFS), HFS+ and Versioning File System.

34. The data storage device of claim 1, wherein the data storage device is compatible with a plurality of Operating Systems, said plurality of Operating Systems selected from the group consisting of Linux, uC Linux, Windows CE, Windows NT, Windows 98, Windows XP, Windows Vista, and Windows Server.

35. The data storage device of claim 1, wherein at least one said flash device is a single level cell (SLC) NAND flash device.

36. The data storage device of claim 1, further comprising Synchronous Dynamic Access Memory (SDRAM) in communication with said controller.

37. The data storage device of claim 1, wherein said interface is selected from the group consisting of Serial Advanced Technology Attachment and Peripheral Component Interconnect.

38. The data storage device of claim 1, wherein each said at least two flash devices is further comprising an interface and microprocessor.

* * * * *